INVENTOR.
WERNER GESCHE
HERBERT STEUER
ERHARDT KARIG
ATTORNEYS

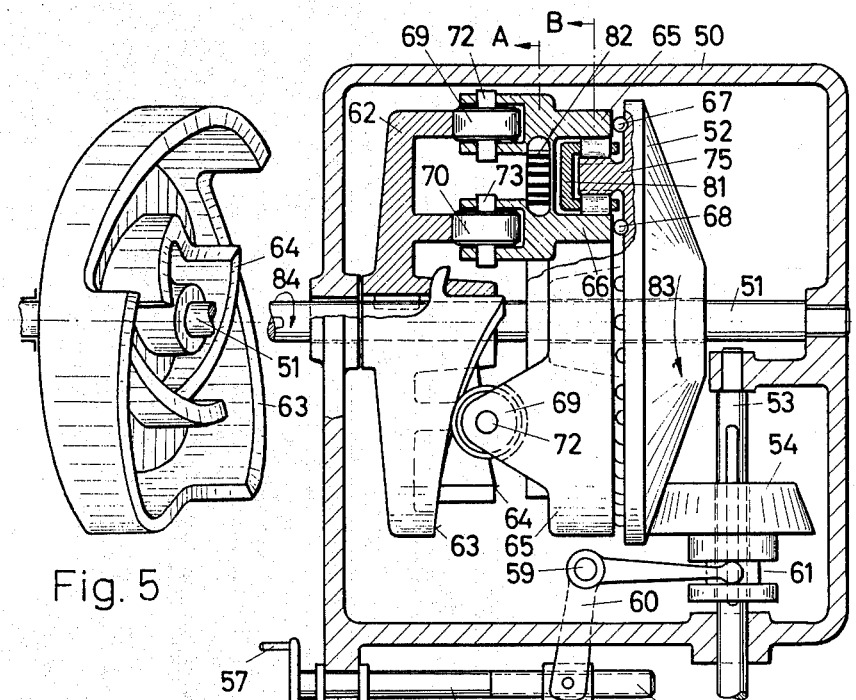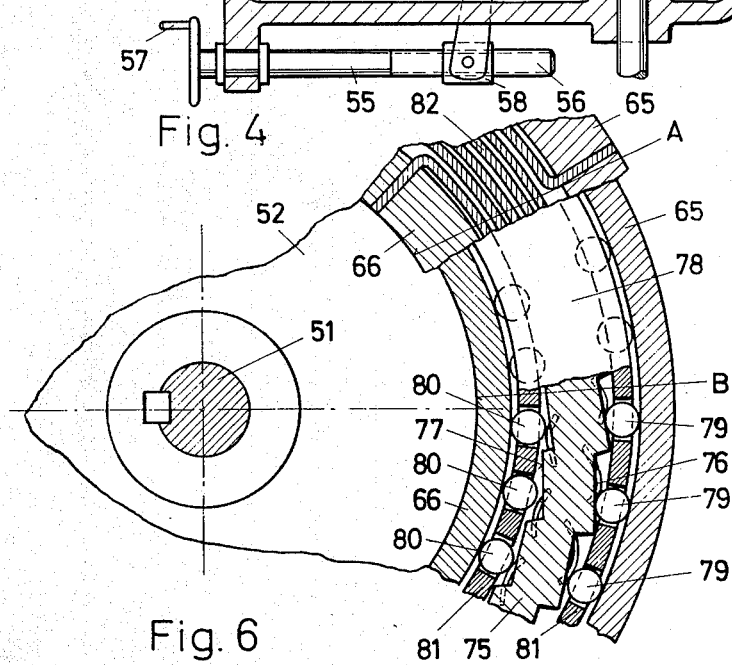

United States Patent Office 3,224,287
Patented Dec. 21, 1965

3,224,287
INFINITELY VARIABLE CONE PULLEY TRANSMISSION
Werner Gesche, Herbert Steuer, and Erhardt Karig, Bad Homburg von der Höhe, Germany, assignors to Reimers Getriebe K.G., Ascona, Switzerland, a firm of Switzerland
Filed Nov. 4, 1963, Ser. No. 321,004
Claims priority, application Germany, Nov. 15, 1962, R 33,883
9 Claims. (Cl. 74—230.17)

The present invention relates to an infinitely variable cone pulley transmission which is provided with torque responsive and speed-ratio responsive pressure applying means.

There are various types of infinitely variable cone pulley transmissions already known, in which, for changing the speed ratio of the transmission, two pairs of conical pulley disks are mounted on the driving and driven shafts so as to be movable in the axial direction thereon and the disks of each pair are movable relative to each other in the opposite direction to the movement of the disks of the other pair, and in which the power is transmitted between the two pairs of conical disks by an endless driving element which, if the conical disks have smooth surfaces, may consist of a V belt or a link chain which is provided with friction means, and if the conical disks are provided with teeth, of a so-called tooth-forming chain. There is another type of cone pulley transmissions which consists, for example, of two smooth conical disks which are mounted on shafts, the axes of which intersect with each other and which roll directly along each other. In a transmission of this last type, it is absolutely essential for transmitting the frictional force that one conical disk is pressed in the axial direction against the other. In belt or chain driven cone pulley transmissions of the first-mentioned type, it is likewise advisable to produce the necessary tension of the driving element by pressing the conical disks axially against this element. In order to attain a good efficiency of the transmission, and in friction transmissions, also in order to prevent slipping of the driving element, it is advisable to make this axial pressure of a strength in proportion to the torque acting upon the transmission shaft, and also dependent upon the particular speed ratio to which the transmission is set. There are pressure applying means known of the type in which the torque which acts upon the shaft is transmitted to the axially movable conical disk by roll bodies and helical cam tracks of a varying pitch which cooperate with these roll bodies, and whereby at the same time an axial pressure is produced, the strength of which is proportional to the torque acting upon the shaft and which also depends upon the speed ratio of the transmission in such a manner as is deemed necessary. These pressure applying means have, however, the disadvantage that, when the torque is reversed, the roll bodies must be brought into engagement with the helical cam tracks which are inclined inversely to each other. This results in a lost motion or backlash the size of which depends upon the speed ratio to which the transmission is adjusted and which leads to hard knocks which may damage the transmission.

Although there are other pressure applying mechanisms known in which this backlash is avoided, the axial pressures produced by these mechanisms cannot be made responsive to the speed ratio in the manner as desired or only by rather expensive means. Furthermore, these pressure applying mechanisms require the axial pressures produced to be braced by thrust ball bearings on stationary parts of the transmission. This is not required by the pressure applying mechanisms as first mentioned above since the axial pressures produced by them may be braced on the revolving transmission shaft.

It is also already known to connect the two above-mentioned pressure applying mechanisms in series with each other. This, however, renders the transmission very large, heavy, and expensive.

Similar disadvantages are present in those transmissions which are provided with rollers which revolve with the transmission shaft and are rotatable about radially extending axes, and which cooperate with inclined surfaces which may be pivoted in accordance with the axial displacement of one of the two conical disks as required for changing the speed ratio of the transmission. With a construction of this type it is possible only with difficulty to attain the desired dependence of the axial pressures upon the particular speed ratio as selected, since generally this dependence is not a linear function of the axial displacement of the conical disk. It is therefore necessary to provide cam or lever gears for this purpose.

Constructions of this type are inferior to that of a pressure applying mechanism as previously mentioned in which the torque which is exerted upon the shaft is transmitted to the axially movable conical disk by means of roll bodies and associated helical cam tracks of a varying pitch, because by making the helical cam tracks of suitable dimensions, this mechanism permits the application of the proper axial force upon the movable conical disk which may be required in accordance with any desired speed ratio and also because there are no heavy thrust bearings required for bracing these axial forces. The only disadvantage of such a pressure applying mechanism is the backlash and the resulting knocking which occurs when the direction of the torque is reversed.

It is the principal object of the present invention to overcome this disadvantage of a pressure applying mechanism of the last-mentioned type.

The present invention therefore relates to improvements in an infinitely variable cone pulley transmission of the type in which for changing the speed ratio of the transmission two pairs of conical pulley disks are mounted on the driving and driven shafts so as to be movable in the axial direction thereon and the disks of each pair are axially movable relative to each other in the opposite direction to the axial movement of the disks of the other pair, and in which a pressure applying mechanism is employed which produces the axial pressure which is required for pressing the axially movable conical disk toward the other and against the driving element so as properly to transmit the driving force, and in which the axial pressure thus produced has a strength in proportion to the torque acting upon the associated transmission shaft and is also dependent upon the desired speed ratio of the transmission as determined by the axial movement of the conical disk. This pressure applying mechanism is provided with cam tracks with helical surfaces of a varying pitch and with roll bodies which cooperate with these cam tracks and also transmit the torque from the transmission shaft to the conical friction disk and vice versa. In a pressure applying device of this type the above-mentioned object is attained according to the invention by providing at least one axially movable conical disk of the transmission with two coaxial pressure applying mechanisms which are rotatable relative to each other and one of which has cam tracks with helical surfaces of a varying pitch ascending toward the left, while the cam tracks of the other have similar surfaces ascending toward the right. These two pressure applying mechanisms are further designed so as to be rotatable relative to each other in such a manner that, when the conical disk is shifted in the axial direction for changing the speed ratio, the cam tracks of both pressure applying mechanisms will be held in constant engagement with the associated roll bodies.

When one of the two pressure applying mechanisms transmits the torque and thereby produces the axial contact pressures in proportion to the torque and in accordance with the speed ratio, the other pressure applying mechanism of the same construction is in a neutral position ready to take over the function of the first mechanism without any backlash and knocking as soon as the direction of the torque is reversed. This design has the further advantage that, since each pressure applying mechanism has only to be provided with helical cam tracks which ascend in only one direction, there is no difficulty in finding adequate space for providing these tracks. This fact is especially important in friction transmissions which require high contact pressures and therefore shallow cam tracks at a large range of speed ratios.

The present invention may be carried out in many different embodiments depending upon the particular parts on which the cam tracks and roll bodies are to be mounted and upon whether the two pressure applying mechanisms are turned positively or by indirect means in opposite directions to each other.

One advantageous embodiment of the invention is attained, for example, by making the two pressure applying mechanisms in the form of smooth cylindrical tubular members which are provided with cam tracks on their outer end surface and are located within each other, and one of which is rigidly secured to the axially movable conical disk, while the other tubular member is rotatable on a thrust bearing relative to this conical disk. Each of these tubular members is provided with at least one helical slot which extends inversely to and intersects with the slot of the other tubular member. In these intersecting slots a pair of rollers is guided which is rotatable on a common shaft which extends vertically to the transmission shaft and is mounted on a ring which is adjustable in the axial direction. The roll bodies of this mechanism which cooperate with the cam tracks are provided in the form of pressure rollers which are arranged in pairs, each pair of which is rotatable on a shaft which extends radially to the transmission shaft and is mounted on a bracing disk which is rigidly connected to the transmission shaft.

In another preferred embodiment of the invention, the object of the latter is attained by designing the two pressure applying mechanisms in the form of two tubular members which are located within each other and rotatable relative to the conical disk, and both of which are provided at one end surface with cam tracks, and by providing a double-acting grip roller freewheel clutch which permits either of the two tubular members to be nonrotatably coupled to the conical disk while the other tubular member is held in the released position. The roll bodies of this embodiment which cooperate with the cam tracks are made in the form of pressure rollers which are rotatable on shafts which extend radially to the transmission shaft and are mounted in a bracing disk which is rigidly connected to the transmission shaft. For turning the released tubular member relative to that which is nonrotatably coupled to the conical disk, positively acting guide means are provided which consist of auxiliary rollers which extend parallel to the main pressure rollers in the bracing disk and cooperate with auxiliary cam tracks which are mounted at equal distances from the main cam tracks.

In a third preferred embodiment of the invention, the two pressure applying mechanisms consist of a bracing disk which is rigidly connected to the transmission shaft and provided with two sets of cam tracks concentric within each other and with inversely inclined cam surfaces thereon, and of two concentric intermediate rings each carrying pressure rollers which cooperate with the cam tracks and are rotatable on shafts which extend radially to the transmission shaft. These intermediate rings are rotatable relative to the conical disk but either of them may be nonrotatably coupled to the conical disk by means of a common double-acting grip roller freewheel clutch while the other intermediate ring is held in the released position. Furthermore, the two intermediate rings are connected to each other by a spiral spring under tension for the purpose of turning them relative to each other.

The double-acting grip roller freewheel clutch as employed in the two last-mentioned embodiments preferably consists of two sets of grip rollers which are guided and connected to each other by a common cage which, when one grip roller set moves to the engaged position, automatically moves the other set to the released position.

A grip roller freewheel clutch of the above-mentioned type may be very simply produced by making the outer peripheral surface of the hub of the conical disk forming one of the clamping surfaces of the clutch of a polyhedral shape upon which both sets of grip rollers are adapted to act, and by guiding the grip rollers by a tubular cage in which the two sets are held behind each other in the axial direction and offset peripherally to each other by the distance of one-half roller diameter.

Another advantageous feature consists in providing the conical disk with an annular flange, the inner and outer peripheral surfaces of which are provided with clamping surfaces for the two grip roller sets, and in connecting the two grip roller sets to each other by means of a cage of a U-shaped cross section, the two arms of which carrying the two grip roller sets overlap the annular flange.

A grip roller freewheel clutch of the above-mentioned design permits the transmission according to the invention to be made of a very compact size. Such transmissions are especially desired for driving machine tools since their small size permits them to be easily installed in or on such a machine.

The features and advantages of the present invention will become more clearly apparent from the following detailed description of three preferred embodiments thereof which are illustrated in the accompanying drawings, in which:

FIGURE 4 shows a longitudinal section of a friction transmission with conical friction disks together with a pressure applying mechanism according to a third embodiment of the invention;

FIGURE 5 shows a perspective view of the bracing disk as employed in the embodiment according to FIGURE 4; while FIGURE 6 shows an enlarged partial section which is taken along the lines A and B in FIGURE 4.

Figure 1:
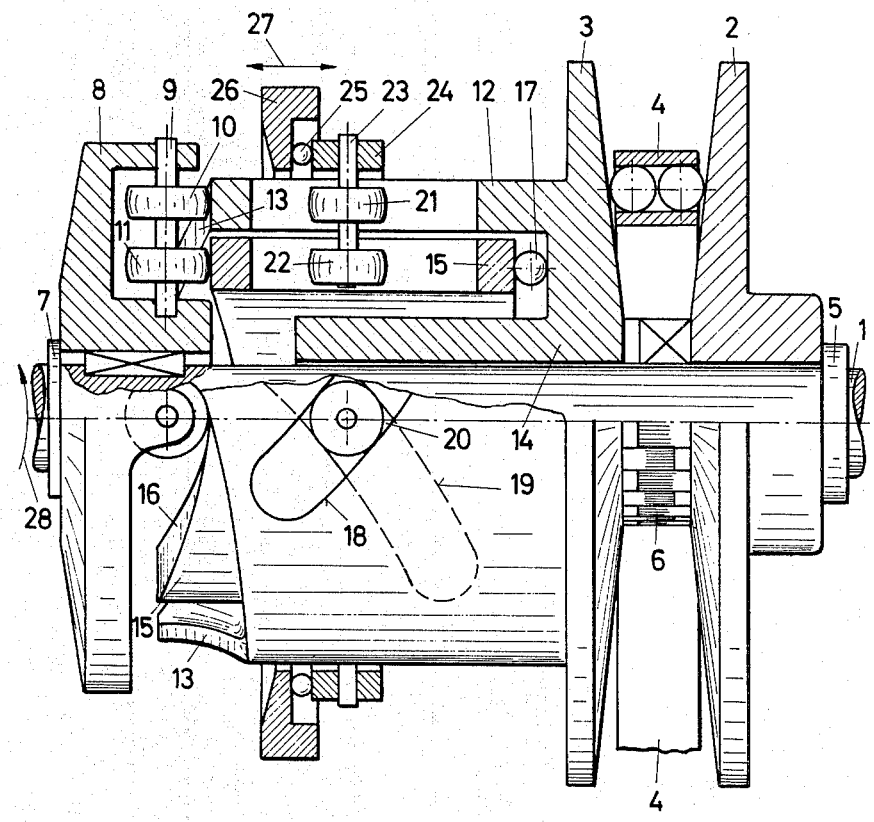
FIGURE 1 shows a side view, partly in section, of one set of conical disks of a chain-driven cone pulley transmission together with a pressure applying mechanism according to a first embodiment of the invention.

In the drawings, FIGURE 1 illustrates a first embodiment of the lost-motion and knock preventing pressure applying mechanism according to the invention in combination with one of the two sets of conical disks of an infinitely variable cone pulley transmission in which the driving force is transmitted by friction. All of the parts which are not essential for explaining the invention, such as the second set of conical disks, the transmission housing, the shaft bearings, and the adjusting means for changing the speed ratio, are either entirely omitted or only diagrammatically indicated in the drawings.

The one disk set of the transmission as illustrated in FIGURE 1 consists of a transmission shaft 1 on which two conical friction disks 2 and 3 are mounted so as to be freely rotatable thereon, and of a driving element 4 in the form of a double-roller chain which is adapted to run between these disks 2 and 3. Shaft 1 is provided with a flange 5 which braces the conical disk 2 in the axial direction. Disk 3 is slidable in the axial direction on shaft 1 but nonrotatably connected to the conical disk 2, for example, by a jaw clutch 6, as illustrated diagrammatically in FIGURE 1.

Shaft 1 also carries a bracing disk 8 which is nonrotatably connected thereto and prevented from sliding in the axial direction toward the left of the drawing by a flange 7. This supporting disk carries, equally divided over its circumference, for example, three shafts 9 which extend radially to the transmission shaft 1 and each of which carries rotatably thereon two pressure rollers 10 and 11.

The conical disk 3 has rigidly connected thereto a smooth cylindrical tubular member 12 which is provided on its end side with several, for example, three, cam tracks 13 with an equal direction of pitch which are spaced at equal peripheral distances from each other. These cam tracks 13 cooperate with the pressure rollers 10. Between the tubular member 12, which is rigidly connected to the conical disk 3, and the hub 14 of disk 3, there is another smooth cylindrical tubular member 15 which is likewise provided on one end with several, for example, three, cam tracks 16 which have a pitch inverse to the direction of the cam tracks 13 on the tubular member 12 and cooperate with the pressure rollers 11. This tubular member 15 is freely rotatable relative to the conical disk 3 and braced against it by a thrust bearing 17. Both tubular members 12 and 15 are provided with helical slots 18 and 19, respectively, which extend in opposite directions to each other. At their points of intersection, slots 18 and 19 form openings 20 each of which contains a pair of rollers 21, 22 which is rotatably mounted on a common shaft 23 which extends vertically to the transmission shaft 1. Roller 21 is movable in slot 18 of the tubular member 12 and roller 22 in slot 19 of member 15. Shafts 23 of each pair of rollers are mounted in a ring 24 which is adjustable in the axial direction. This ring 24 which is rotatable together with the conical disk 3 is braced by a thrust bearing 25 against a nonrotatable setting ring 26 which may be adjusted in the axial direction in accordance with the double arrow 27 by means of a setting device, not shown, for varying the speed ratio of the transmission.

Cam tracks 13 and 16 on the tubular members 12 and 15 which are inclined inversely to each other and also slots 18 and 19 in these two members which likewise extend inversely to each other form helical surfaces of a varying pitch.

The mode of operation of the transmission as above described is as follows: Assuming that the transmission shaft 1 is acted upon by a torque in the direction of the arrow 28, this torque is then transmitted to the bracing disk 8 with the result that the pressure rollers 10 on shaft 9 tend to roll upwardly along cam tracks 13 on the tubular member 12. In order to do so, rollers 10 would have to shift the conical disk 3 toward the right which is, however, possible only if at the same time the double-roller chain 4 would move outwardly between the conical disks 2 and 3 which would require this chain to move inwardly between the conical disks of the second set, not shown. Since this movement is prevented by the other part of the setting device corresponding to ring 26 for the adjustment of the desired speed ratio, pressure rollers 10 will transmit the torque acting upon the transmission shaft 1 directly to the conical disk 3 and also press the same in accordance with the particular inclination of cam tracks 13 at their points of engagement with pressure rollers 10 with a force proportional to that of the torque on shaft 1 against chain 4 and the latter against the conical disk 2 which is fixed in the axial direction. In this manner the necessary axial pressure is produced for transmitting the frictional force between chain 4 and disks 2 and 3 in proportion to the strength of the torque on shaft 1 and in accordance with the particular speed ratio to which the transmission is adjusted.

The pairs of rollers 21, 22 which are guided in the intersecting slots 18, 19 hold the freely rotatable tubular member 15 in such an angular position that their cam tracks 16 which are inclined inversely to the cam tracks 13 will be constantly held in engagement with the pressure rollers 11 on shafts 9 of the bracing disk 8.

If for any reason the direction of the torque acting on shaft 1 is suddenly reversed, for example, in an automobile transmission when changing from an uphill drive to a downhill drive, pressure rollers 11 will take over immediately and without any lost motion or backlash the transmission of the torque to the tubular member 15 and also the generation of the axial contact pressure. Although the tubular member 15 is freely rotatable relative to the conical disk 3, it is prevented from rotating by the pair of rollers 21, 22 since ring 24 which carries this pair of rollers is held axially in the position as illustrated by the setting device for adjusting the speed ratio of the transmission which, in turn, prevents the tubular member 15 from turning. In this case, the setting ring 26, i.e. the speed-ratio setting device, must exert a bracing force which is capable of preventing any axial movement of ring 24. The torque acting in the reverse direction is therefore in this case further conducted via the pressure rollers 11 and cam tracks 16 to the tubular member 15 and from the slot 19 thereof to the pair of rollers 22, 21 and then from roller 21 in slot 18 to the tubular member 12 which is rigidly connected to the conical disk 3, and thus to the conical disk 3 itself, while the axial force is produced is transmitted in proportion with the torque and in accordance with the particular inclination of cam tracks 16 via the tubular member 15 and thrust bearing 17 directly to the conical disk 3.

Depending upon the direction of the torque acting upon the transmission shaft 1, either only the pressure rollers 10 cooperate with the cam tracks 13 or pressure rollers 11 cooperate with cam tracks 16 in order to transmit the torque and to produce the axial contact pressure, whereas the respective other pressure rollers and cam tracks are inactive but in a neutral position, ready to take over immediately and without any backlash the functions of the previously acting pressure rollers and cam tracks as soon as the torque is reversed.

If the setting ring 26 is shifted in either axial direction as shown by the double-arrow 27 by means of the device for intentionally varying the speed ratio of the transmission, ring 24 and thus also the pair of rollers 21, 22 will be shifted in the axial direction. Since rollers 21 and 22 are guided in the intersecting slots 18 and 19 of the tubular members 12 and 15, these two members must turn in opposite directions relative to each other. The result of this is that the conical disk 3 is shifted in the axial direction for such a distance that the two sets of cam tracks 13 and 16 will remain in engagement with their associated pressure rollers 10 and 11.

The pressure applying mechanism as previously described has the advantage that the axial pressure as required for the transmission of the frictional force is always proportional to the torque acting upon the transmission shaft and that it may also be made dependent to any desired extent upon the axial displacement of the conical disk 3, that is, upon the particular speed ratio to which the transmission is adjusted, since it is for this purpose only necessary to design the varying pitch of the helical cam tracks 13 and 16 accordingly. The provision of two coaxial pressure applying mechanisms which may be turned relative to each other and one of which has cam tracks with left-hand and the other with right-hand helical surfaces, i.e. the cam tracks 13 and 16, permits at any arbitrary change of the speed ratio to move the then unloaded cam tracks so as to follow the loaded cam tracks, so that both sets of cam tracks will be held in constant engagement with their associated pressure rollers 10 and 11, whereby at a reversal of torque the previously unloaded cam tracks will take over the function of the previously loaded cam tracks without any lost motion or backlash as it always occurs in the known types of pressure applying mechanisms with cam tracks of a varying pitch.

Figure 2:
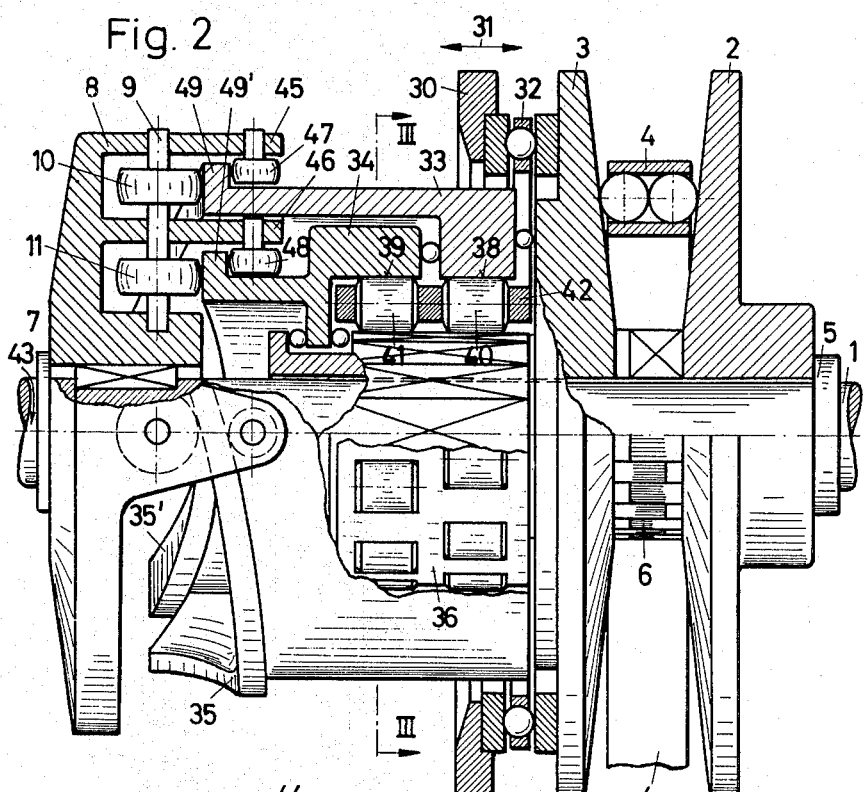
FIGURE 2 shows a similar view of a second embodiment of the invention.
Figure 3:
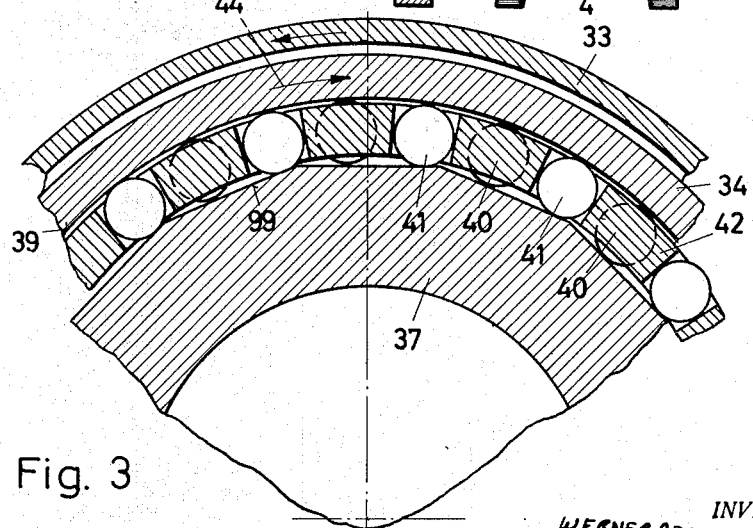
FIGURE 3 shows a partial cross section which is taken along the line III—III of FIGURE 2.

FIGURES 2 and 3 illustrate a further embodiment of the pressure applying mechanism according to the invention for one disk set of an infinitely variable cone pulley transmission of substantially the same construction as the disk set as shown in FIGURE 1. For this reason, the corresponding parts in both drawings are also identified by the same reference numerals.

In the embodiment of the invention as shown in FIGURE 1, the principal object of this invention is attained by means of a very simple construction which, however, has still the disadvantage that at a reversal of torque very great bracing forces have to be transmitted by the speed-ratio setting device to the setting ring 26. This disadvantage is overcome by the embodiment according to FIGURES 2 and 3. The disk set of an infinitely variable cone pulley transmission as shown in FIGURE 2 again consists of a transmission shaft 1 on which two conical friction disks 2 and 3 are freely rotatable between which a driving element 4 runs, which again consists of a double-roller chain. Shaft 1 has a flange 5 on which the conical disk 2 engages in the axial direction. The other conical disk 3 is slidable in the axial direction on shaft 1 but is nonrotatably connected to disk 2, for example as in FIGURE 1, by a jaw clutch 6, as indicated diagrammatically. Also as in FIGURE 1, shaft 1 carries a bracing disk 8 which is nonrotatably connected thereto and prevented from sliding in the axial direction toward the left of the drawing by a flange 7. This bracing disk 8 carries, equally divided over its circumference, for example, three shafts 9 which extend radially to the transmission shaft 1 and each of which carries pressure rollers 10 and 11.

The adjusting device, not shown, for arbitrarily varying the speed ratio of the transmission acts upon a nonrotatable setting ring 30 which is axially slidable in the directions as indicated by the double arrow 31 and is braced through a thrust bearing 32 on the axially slidable conical disk 3.

The pressure applying mechanism according to this embodiment of the invention consists of two tubular members 33 and 34 which are disposed within each other and are provided on their outer end surfaces facing the supporting disk 8 with cam tracks 35 and 35', respectively, of a varying and inversely directed pitch which cooperate with the pressure rollers 10 and 11 in the same manner as already described with reference to FIGURE 1. The two tubular members 33 and 34 are rotatable relative to the axially movable conical disk 3, but they may be alternately connected to the hub 37 of the axially movable conical disk 3 by means of a double-acting grip roller freewheel clutch 36 which is common to both tubular members 33 and 34. As illustrated more clearly in FIGURE 3, the peripheral surface of hub 37 of the conical disk 3 has a polyhedral shape and forms the inner clamping surface of the double-acting grip roller freewheel clutch. The outer clamping surfaces are formed by the cylindrical inner surfaces 38 and 39 of the tubular members 33 and 34, which surfaces have the same diameter. The two sets of grip rollers 40 and 41 are peripherally offset relative to each other and are held within a roller cage 42. Rollers 40 which cooperate, on the one hand, with the inner cylindrical clamping surface 38 of the tubular member 33 and, on the other hand, with the clamping surfaces 99 of hub 37 are offset relative to the grip rollers 41 within the roller cage 42 in such a manner that both roller sets can never grip simultaneously. If, therefore, rollers 40 are clamped between the cylindrical surface 38 and the polyhedral surface of hub 37, rollers 41 which are guided by the cage 42 will be released in the freewheel position of the freewheel clutch.

If a torque is exerted upon shaft 1 in the direction of the arrow 43, this torque will be transmitted through the pressure rollers 11 and cam tracks 35' to the tubular member 34, while at the same time an axial force will be transmitted to the tubular member 34 which has a strength in proportion to the strength of the torque and is dependent upon the particular angle of inclination of cam tracks 35' at the point of engagement of pressure rollers 11. Due to this torque, the tubular member 34 will then turn for a very small angular distance relative to hub 37 of disk 3 in the direction of the arrow 44, as shown in FIGURE 3, whereby the set of grip rollers 41 will be moved into the clamping position. At the same time, grip rollers 40 which cooperate with the tubular member 33 will be moved into the freewheel position.

If the direction of the torque is reversed, it will be transmitted through the pressure rollers 11 and cam tracks 36 to the tubular member 34, while likewise an axial force is produced which is proportional to the strength of the torque and depends upon the particular angle of inclination of cam tracks 36. Rollers 41 will then be moved into the clamping position and rollers 40 in to the freewheel position. Thus, at either of the two possible directions of the torque, there is always only one of the tubular members 33 or 34 nonrotatably connected to the conical disk 3 by means of the double-acting freewheel clutch.

In order to turn the respective tubular member which is not acted upon by the torque at any axial position of the conical disks 3 in such a manner that, when a reversal of torque occurs, its cam tracks will at a torque reversal be ready immediately and without lost motion to take over and transmit the torque, bracing disk 8 is provided adjacent to the bearings of the pressure rollers 10 and 11 with extensions 45 and 46 in which auxiliary rollers 47 and 48 are mounted each of which engages with the rear side of a flange 49 or 49' on cam tracks 35 and 35', respectively. The surfaces of flanges 49 and 49' which cooperate with the auxiliary rollers 47 and 48 have the same shape as cam tracks 35 and 35'. At any axial movement of the conical disk 3 and the two tubular members 33 and 34, that tubular member which is not acted upon by the torque is—because of its free rotatability—turned so far relative to the tubular member which is acted upon by the torque and clamped tightly to the conical disk 3 by the grip roller freewheel clutch 36 that the other inversely directed cam tracks loosely engage upon the pressure rollers 10 or 11 which are not under load. Otherwise, the mode of operation of this mechanism according to FIGURES 2 and 3 corresponds in principle to that of the mechanism as described with reference to FIGURE 1.

A further embodiment of the pressure applying mechanism according to the invention is illustrated in FIGURES 4 to 6 in combination with a cone friction transmission, the conical friction disks of which are axially slidable on shafts, the axes of which intersect with each other. As shown in FIGURE 4, one of these shafts 51 is rotatably mounted in a housing 50 and has one of the two conical friction disks 52 loosely rotatable and axially slidable thereon, The second shaft 53, the axis of which intersects at right angles with the axis of shaft 51, carries the second conical friction disk 54 which is nonrotatably secured to but axially slidable on this shaft and in positive frictional engagement with the conical friction disk 52. For changing the speed ratio of this transmission, the conical friction disk 54 may be shifted in the axial direction by means of a setting device 55 which may consist, for example, of a threaded spindle 56 which is rotatably mounted on the housing and may be turned by means of a handwheel 57 and of a nut 58 which is screwed on the spindle 56 and pivotably connected to one end of a bell crank 60 which turns about a stationary pivot 59 and the other end of which engages into an annular groove 61 in the hub of the conical friction disk 54. When the handwheel 57 is turned, nut 58 moves along the thread on spindle 56 so that the conical friction disk 54 is moved axially along its shaft 53, for example, inwardly. This forces the other conical friction disk 52 to yield in its axial direction, which is made possible by the cam tracks of a varying pitch in the same manner as described with reference to the mechanisms according to FIGURES 1 to 3.

Shaft 51 has rigidly secured thereto a bracing disk 62 which is provided with concentric cam tracks 63 and 64 which are inclined inversely to each other. This bracing disk 62 with its concentric cam tracks is shown separately in perspective in FIGURE 5. Between this bracing disk 62 and the conical friction disk 52 there are two concentric rings 65 and 66 interposed, which are rotatably braced by thrust ball bearings 67 and 68 on the rear side of the conical friction disk 52. Each of these two intermediate rings 65 and 66 carries several, for example, three, pressure rollers 69 and 70 which are rotatable about their axes 72 and 73 which extend radially to the transmission shaft 51. These pressure rollers 69 and 70 cooperate with the inversely inclined cam tracks 63 and 64, respectively.

The conical friction disk 52 is provided on its rear side with an annular flange 75 which extends coaxially to the two intermediate rings 65 and 66 and the inner and outer peripheral sides of which are provided with clamping surfaces 76 and 77 forming parts of a grip roller freewheel clutch 78, as shown particularly in FIGURE 6. This freewheel clutch further consists of two sets of grip rollers 79 and 80, one set 79 of which cooperates with the outer clamping surfaces 76 of flange 75 and the outer intermediate ring 65, while the other set of grip rollers 80 cooperates with the inner clamping surfaces 77 of flange 75 and the inner intermediate ring 66. The two sets of grip rollers are connected to each other and guided by a roller cage 81 of a U-shaped cross section. The two sets of grip rollers and/or the clamping surfaces are placed in such a position relative to each other that one grip roller set will be in the freewheel position when the other grip roller set has reached the clamping position. The clamping surfaces 76 and 77 are inclined at such an angle that one grip roller set will lock in one direction of movement and the other grip roller set in the other direction. Therefore, either the outer intermediate ring 65 will be nonrotatably connected to the flange 75 on the conical disk 52 when moving in one direction or the inner intermediate ring 66 will be nonrotatably connected thereto when moving in the other direction.

The two intermediate rings 65 and 66 are connected to each other by a spiral spring 82 under tension which tends to turn the two intermediate rings relative to each other. By the action of this spring, the particular intermediate ring which is not acted upon by the torque and is therefore not coupled to the friction disk 52 will be turned relative to the other intermediate ring in such a manner that the two sets of pressure rollers 69 and 70 will engage at corresponding points on the inversely inclined cam tracks 63 and 64 so that, if a reversal of torque occurs, the pressure rollers which were previously not under a load will take over immediately and without any lost motion the function of the previously loaded pressure rollers.

If, for example, the conical friction disk 54 is shifted by the setting device 55 in the axial direction toward shaft 51, the other conical friction disk 52 must yield toward the left of FIGURE 4, which is possible because of the relative rotation of the conical friction disk 52 to the shaft 51 in the direction as indicated by the arrow 83, whereby the pressure rollers 69 will roll downwardly along the cam tracks 63 so that the conical friction disk 52 can shift in the axial direction. This is true under the assumption that a torque acts upon the shaft 51 in the direction of the arrow 84 and is then transmitted by the bracing disk 62, the cam tracks 63, the pressure rollers 69, the intermediate ring 65, and the outer grip roller set 79 to the flange 75 on the conical friction disk 52. Simultaneously herewith, cam tracks 63 and the associated pressure rollers 69 produce an axial pressure which has a strength in proportion to the torque acting upon the transmission shaft and is also dependent upon the particular inclination of cam tracks 63 at their points of engagement with the pressure rollers 69. Since these cam tracks have a varying pitch, the strength of this axial force (while the torque remains equal) varies in accordance with the axial displacement of the conical friction disk 52, i.e. with the change of the speed ratio of the transmission. Under the conditions as above assumed, the inner intermediate ring 66 will be freely rotatable relative to the conical friction disk 52, and it will be turned by the spiral spring 82 so far that, after disk 52 has been axially shifted toward the left of FIGURE 4, pressure rollers 70 will also remain in engagement with the associated cam tracks 64. As soon as the torque reverses in direction, pressure rollers 70 take over the function of pressure rollers 69 without any lost motion, and the torque is then transmitted by the cam tracks 64, pressure rollers 70, the inner intermediate ring 66, and the inner grip roller set 80 to the conical friction disk 52, and this results likewise in the generation of an axial contact pressure which is proportional to the torque and also dependent upon the speed ratio of the transmission.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. An infinitely variable transmission having transmission shafts, conical disks axially slidable on said shafts, setting means for shifting said disks relative to each other for changing the speed ratio of said transmission, and pressure applying means moving at least one of said conical disks on one of said shafts axially toward another disk for transmitting the driving force in proportion to a torque acting upon said shaft and also dependent upon the axial movement of said conical disk by said setting means, said pressure applying means comprising two units each comprising cam tracks having helical surfaces of a varying pitch and inclined inversely to the cam tracks of the other unit, roll bodies operatively associated with said cam tracks for transmitting a torque from said transmission shaft to said conical disk and vice versa, and means for turning said units in opposite directions to each other when said conical disk is shifted in the axial direction by said setting means, whereby said cam tracks of both units are held in constant engagement with the associated roll bodies, said two pressure applying units comprising a bracing member rigidly connected to said transmission shaft, and two smooth cylindrical tubular members disposed within each other and having said cam tracks on one end thereof, the first of said tubular members being rigidly connected to said conical disk, a thrust bearing interposed between the other end of the second tubular member and said conical disk, said second tubular member being rotatable on said thrust bearing relative to said conical disk, said means for turning said units in opposite directions to each other comprising wall surfaces of at least one helical slot in the walls of each of said tubular members, said slots being directed inversely to each other and intersecting with each other so as to form coaxial openings, a pair of rollers guided within said openings and having a common shaft extending axially to said transmission shaft, and a ring around said tubular members, said common shaft being mounted on said ring, said setting means adapted to act upon said ring for shifting said conical disk in the axial direction, said roll bodies forming pairs of pressure rollers engaging with said cam tracks and rotatable on shafts mounted on said bracing member and extending radially to said transmission shaft.

2. An infinitely variable transmission having transmission shafts, conical disks axially slidable on said shafts, setting means for shifting said disks relative to each other for changing the speed ratio of said transmission, and pressure applying means moving at least one of said conical disks on one of said shafts axially toward another disk for transmitting the driving force in proportion to a torque acting upon said shaft and also dependent upon the axial movement of said conical disk by said setting means, said pressure applying means comprising two units each comprising cam tracks having helical surfaces of a varying pitch and inclined inversely to the cam tracks of the other unit, roll bodies operatively associated with said cam tracks for transmitting a torque from said transmission shaft to said conical disk and vice versa, and means for turning said units in opposite directions to each other when said conical disk is shifted in the axial direction by said setting means, whereby said cam tracks of both units are held in constant engagement with the associated roll bodies, said two pressure applying units comprising a bracing member rigidly connected to said transmission shaft, and two tubular members disposed within each other and both rotatable relative to said conical disk and having said cam tracks on one end thereof, a common double-acting grip roller freewheel clutch for nonrotably connecting either of said tubular members to said conical disk when the other tubular member is held in the disengaged position, said roll bodies forming pairs of pressure rollers engaging with said cam tracks and rotatable on shafts mounted on said bracing member and extending radially to said transmission shaft, and positively acting guide means for turning the tubular member which is disengaged by said clutch relative to the tubular member which is nonrotatably connected to said conical disk, said guide means comprising auxiliary rollers rotatably mounted on said bracing member and extending parallel to said pairs of pressure rollers, and auxiliary cam tracks on said tubular members engageable with said auxiliary rollers and spaced at equal distances from said first cam tracks.

3. An infinitely variable transmission having transmission shafts, conical disks axially slidable on said shafts, setting means for shifting said disks relative to each other for changing the speed ratio of said transmission, and pressure applying means moving at least one of said conical disks on one of said shafts axially toward another disk for transmitting the driving force in proportion to a torque acting upon said shaft and also dependent upon the axial movement of said conical disk by said setting means, said pressure applying means comprising two units each comprising cam tracks having helical surfaces of a varying pitch and inclined inversely to the cam tracks of the other unit, roll bodies operatively associated with said cam tracks for transmitting a torque from said transmission shaft to said conical disk and vice versa, and means for turning said units in opposite directions to each other when said conical disk is shifted in the axial direction by said setting means, whereby said cam tracks of both units are held in constant engagement with the associated roll bodies, said two pressure applying units comprising a bracing disk rigidly connected to said transmission shaft and having said inversely inclined cam tracks thereon concentric to each other, and two concentric annular members intermediate said bracking disk and said conical disk, said roll bodies forming pairs of pressure rollers engaging with said cam tracks and rotatable on shafts mounted on said two annular members and extending radially to said transmission shaft, said two annular members being rotatable relative to said conical disk, a common double-acting grip roller freewheel clutch for nonrotatably connecting either of said annular members to said conical disk when the other annular member is held in the disengaged position, and said means for turning said units in opposite directions with respect to each other comprising a spiral spring under tension connecting said two annular members to each other and tending to turn the same relative to each other.

4. A transmission as defined in claim 3, in which said freewheel clutch comprises two sets of grip rollers, a common cage for guiding said grip rollers and connecting said two sets to each other and adapted when one set of grip rollers is moved into engagement with said conical disk to move the other set positively to the disengaged position.

5. A transmission as defined in claim 4, in which said conical disk has a hub, the outer peripheral surface of said hub having a polyhedral shape and forming a common clamping surface for both sets of said grip rollers, said common cage being tubular, said two sets of grip rollers being disposed in said cage in two rows axially behind each other and offset in the peripheral direction relative to each other, by the distance of substantially one half roller diameter.

6. A transmission as defined in claim 4, in which said conical disk has an annular flange thereon, the inner and outer peripheral surfaces of said flange forming clamping surfaces for said two grip roller sets, said common cage having a U-shaped cross section forming two arms, each of said arms containing one of said sets and overlapping said flange.

7. An infinitely variable transmission having transmission shafts, conical disks axially slidable on said shafts, setting means for shifting said disks relative to each other for changing the speed ratio of said transmission, and pressure applying means moving at least one of said conical disks on one of said shafts axially toward another disk for transmitting the driving force in proportion to a torque acting upon said shaft and also dependent upon the axial movement of said conical disk by said setting means, said pressure applying means comprising a first element comprising first and second members mounted coaxially on said disk carrying shaft for turning movement with respect to each other and with respect to the shaft, and a second element comprising a third member mounted on said shaft coaxially with said first and second members, one of said elements having thereon two cam track parts having helical surfaces of varying pitch and inclined inversely to each other and the other element having two roller parts rotatably mounted thereon each engaging one of said cam tracks, each of the parts carried by the first element being carried by a different member thereof, means connecting one of said elements to said shaft for rotation therewith, means operatively connecting the other of said elements to said disk, and means connected to the first and second members for turning them relatively to each other.

8. An infinitely variable transmission as claimed in claim 7, in which said first and second members carry said cam track parts, and one of said first and second members is rigid with said disk.

9. An infinitely variable transmission as claimed in claim 7, in which said first and second members carry said cam parts, and said means connecting the other of the elements to the disk comprises one-way clutch means of opposite effective directions for connecting each of the first and second members to the disk.

References Cited by the Examiner

UNITED STATES PATENTS

| | | | |
|---|---|---|---|
| 1,859,502 | 5/1932 | Erban | 74—208 X |
| 2,030,203 | 2/1936 | Gove et al. | 74—200 |
| 2,125,998 | 8/1938 | Erban | 74—208 |
| 2,127,588 | 8/1938 | Erban | 74—208 |
| 2,140,012 | 12/1938 | Hayes | 74—200 |

FOREIGN PATENTS

| | | |
|---|---|---|
| 1,229,278 | 3/1960 | France. |
| 1,117,352 | 11/1961 | Germany. |
| 940,870 | 1963 | Great Britain. |

DON A. WAITE, *Primary Examiner.*